Figures 1, 2, 3:
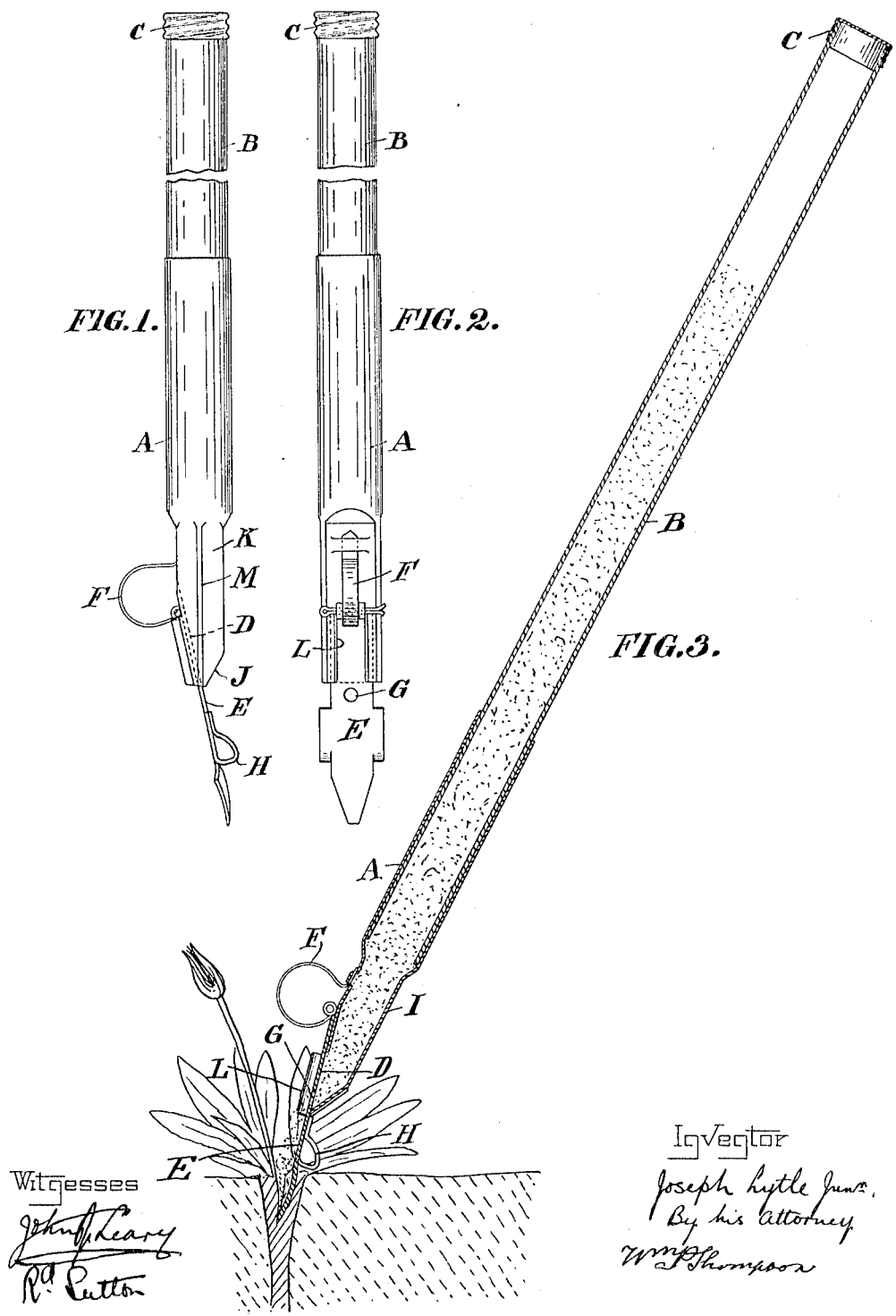

J. LYTLE, Jr.
WEED KILLING DEVICE.
APPLICATION FILED OCT. 28, 1913.

1,105,674.

Patented Aug. 4, 1914.

Witnesses

Inventor
Joseph Lytle Jun<sup>r</sup>.
By his attorney

UNITED STATES PATENT OFFICE.

JOSEPH LYTLE, JR., OF FORMBY, LIVERPOOL, ENGLAND.

WEED-KILLING DEVICE.

1,105,674.     Specification of Letters Patent.     Patented Aug. 4, 1914.

Application filed October 28, 1913. Serial No. 797,743.

*To all whom it may concern:*

Be it known that I, JOSEPH LYTLE, Jr., a subject of the King of Great Britain, residing at Formby, Liverpool, in the county of Lancaster, in the Kingdom of England, have invented certain new and useful Improvements in Weed-Killing Devices, of which the following is a specification.

This invention relates to devices or implements for use in destroying or eradicating weeds in lawns and other situations. The device is of the type in which the act of pressing the cutting blade of the implement into the weed, and thereby overcoming the pressure of a spring, opens a valve which ejects a weed destroying poison into the weed so as to kill or extirpate it.

The present invention is characterized by the feature that the metal tubular body or socket which carries the sliding cutting blade, and the tubular handle or staff which forms a container for the weed destroying powder and enables the implement to be held in the hands, are made separate and as a complete weed piercing instrument and a complete poison containing instrument respectively, and are removably connected together by simply spigoting the one into the other, so that the one forms a continuation of the other, and the latter can be instantly removed from the socket for refilling at the forward end. Furthermore the handle or staff being wholly unobstructed inside, enables the weed destroying powder inserted therein, to be made up in the form of a cartridge.

In the accompanying drawings Figure 1 is a side view of my weed killing device; Fig. 2, a front view thereof; and Fig. 3, a sectional view showing the weed killer in operation.

According to this invention, the implement embodies a metal tubular body or socket A having a straight tubular handle or staff B spigoted into it, whose duty is not only to enable the implement to be held in the hands, but also to form a container for weed destroying powder, or powder put up in the form of cartridges. The upper end of this hollow handle B is closed by a removable cap or plug C, while the lower end is in connection with or forms a continuation of, the metal socket or tubular body A. The said handle can be made of cardboard, papier-mâché or any other suitable material.

The lower open end of the metal tubular body or socket A is preferably beveled as at D, and is closed by a thin sliding blade E which by means of a spring F is kept in such a position as to prevent the escape or ejection of powder from the socket, and forms a valve. The blade E has however a perforation or port G in it, and a projecting flange or abutment H, so that when the end of the blade E is placed on a weed, and pressure applied to force the end of the blade into the weed, the blade will penetrate the weed a certain distance only, because the flange H forms a stop which prevents it penetrating too far. Consequently the continued downward pressure on the handle B forces the blade backward against the action of the spring F, and brings the perforation G into register with the socket, thus opening the port G and allowing poison to run down the blade E or be ejected itno the weed, so that it is absorbed thereby. As soon as the pressure is released, the blade slides back by the spring F, and the escape of the poison is cut off. The said lower end of the socket A is preferably beveled at D as aforesaid, for the purpose of causing the blade to lie in a plane at a convenient angle to the axis of the socket A and handle B, and for the purpose of forming the socket hopper shaped at the end in order that the powder may be directed through the perforation G in the blade when the port is in the open position.

The socket or tubular body part A is by preference made of a piece of metallic tube, and the end is stamped or swaged into the requisite form by dies in a stamping press. These dies first cut out a portion D from the front of the tube at the end and flatten the back I opposite thereto, also close the extreme end J so that the only outlet for the powder is at the front through the opening left below the inclined face or portion D. In order to form guides for the sliding blade E, the tube at each side K of the opening or outlet is flattened by dies, and the margins of these flattened parts are bent inwardly at right angles to form guides or flanges L in which the blade E can slide. The said flanges are inclined to the longitudinal axis of the tube, so that a hopper shaped end is produced. A slight fin or rib M can be produced at the flattened sides K if desired, to increase lateral strength. These would be formed by the surplus metal, resulting from the sides being made flat or rectangular, instead of circular shape.

In use a cartridge containing poison is opened at one end, and inserted into the hollow handle B, so that the poison does not come into contact with the hands at all. The device is then operated as hereinbefore described simply by applying the end of the blade E to the weed and forcing down the handle B, thus opening the valve and allowing poison to run down into the weed, which absorbs it, and the poison kills the root. The blade E may be tapered at the end, and the flange or stop H is by preference at the sides or back of the blade. The handle or staff B being spigoted into the socket A, it can be readily removed whenever required to be replenished with another cartridge of poison which is preferably in the form of finely divided powder.

I declare that what I claim is:—

1. In a weed-killing device, the combination of a tubular body or socket provided with an opening in its lower end; and a cutting blade adapted to normally close said opening, the blade being provided with a port adapted to register with the opening when the blade is pushed downwardly into the weed, whereby material may be discharged from the tubular body and said port directly onto the weed.

2. In a weed-killing device, the combination of a tubular body or socket provided with an opening in its lower end; a cutting blade carried at the lower end of said body and adapted to close the opening left therein, said blade being likewise provided with a port adapted to be brought into register with the opening in the lower end of the tubular body; and a spring for normally keeping the blade in its lowest position and the opening and port out of alinement.

3. In a weed-killing device, the combination of a tubular body or socket provided with an opening at its lower end; a cutting blade slidably mounted upon the lower end of said tubular body and adapted to normally close said opening, said blade being provided with a port normally out of register with the opening; a spring for holding said blade in its lowest position, with the port and opening out of alinement; and a stop secured to the blade and adapted, as the blade is pushed downwardly into the weed, to arrest the movement of the blade and to thereby cause the port and opening to come into alinement upon a further downward movement of the tubular body, whereby the weed-killing material within the tubular body may pass outwardly through the blade and be deposited directly upon the weed.

4. In a weed-killing device, the combination of a tubular body or socket provided with a hopper-shaped bottom having a lateral discharge opening; a cutting blade slidably mounted over said opening and provided with a port; a spring normally tending to force said blade downwardly and to hold the port and opening out of alinement; and a stop carried by the blade and adapted to arrest the movement of the blade as the same is pushed downwardly and to thereby bring the port and opening into alinement.

5. In a weed-killing device, the combination of a tubular body or socket provided with an opening adjacent its lower end; a cutting blade slidably mounted over said opening, said blade being provided with a port adapted to register with the opening under certain conditions; a spring for normally moving said blade downwardly to carry the port out of register with the opening; a stop mounted upon the blade and adapted to arrest its downward movement by contacting with the ground; and a tubular handle fitted in the tubular body and adapted to contain material to be fed onto the plant after the same has been cut or opened up by the blade.

6. In a weed-killing device, the combination of a tubular body or socket provided with a face inclined to the major axis of the tubular body and having an opening therein; a cutting blade slidably mounted over said opening and provided with a port; a spring adapted to move said blade downwardly and to carry the port out of register with the opening; and a stop adapted to arrest the downward movement of the blade after it has been projected into the weed or the ground to a limited extent.

In witness whereof, I have hereunto signed my name this 17 day of October 1913, in the presence of two subscribing witnesses.

JOSEPH LYTLE, Jr.

Witnesses:
G. C. DYMOND,
T. S. SHILLINGTON.

---

Copies of this patent may be obtained for five cents each, by addressing the "Commissioner of Patents, Washington, D. C."